Patented Nov. 27, 1945

2,389,796

UNITED STATES PATENT OFFICE 2,389,796

AQUEOUS POLYISOBUTYLENE EMULSIONS

Gerry P. Mack, Jackson Heights, N. Y., assignor to Advance Solvents & Chemical Corporation, New York, N. Y., a corporation of New York No Drawing. Application September 4, 1943, Serial No. 501,291

11 Claims. (Cl. 260—4)

The present application is a continuation-in-part of the co-pending application Ser. No. 332,699, filed in the name of Gerry P. Mack on May 1, 1940.

The present invention relates to the manufacture of purely aqueous emulsions of high molecular polyisobutylene, to the stabilization of purely aqueous high molecular polyisobutylene emulsions, and to the novel, stable, purely aqueous polyisobutylene emulsions obtained by the methods according to the invention.

Polyisobutylene is sold in the trade under the trade name "Vistanex." There are several grades of this material ranging from soft, viscous, sticky products of a molecular weight of about 7,000 to tough, elastic, rubbery solids of a molecular weight of 500,000 and more. The polymer at an average weight of about 27,000 is a true solid, permitting accurate tests with regard to hardness and the like. From this point upward it partakes more and more of the nature of rubber while from said point downwards it tends to become softer, more plastic and stickier. Despite their likeness to rubber, the polyisobutylenes with a molecular weight above 27,000 have one characteristic which is distinctly unlike the characteristics of rubber and that is their behavior towards water. While rubber is hydrophilic and attracts water, the polymers are hydrophobic and repel water. This tendency of the high molecular polyisobutylenes renders it difficult to emulsify the same without the use of organic solvents and to obtain purely aqueous, stable, high molecular polyisobutylene emulsions.

One object of the present invention is to overcome the hydrophobic properties of the high molecular polyisobutylenes to a sufficient extent to permit the formation of uniform, easily handled, purely aqueous dispersions.

Another object of the invention is to obtain smooth, purely aqueous dispersions of polyisobutylenes having molecular weights above 27,000 with relatively small additions of foreign matter, so that the resulting emulsions have a high degree of homogeneity.

More specifically, it is an object of the invention to produce purely aqueous polyisobutylene emulsions which contain only small quantities of emulsifying and dispersing agents and no or only small proportions of conjunctive materials which are capable of being dispersed in water and homogeneously blended with polyisobutylene.

A further object of the invention is to emulsify high molecular polyisobutylene in a process of relatively short duration which leads reliably to the production of smooth, easily dilutable, purely aqueous emulsions.

A still further object of the invention is to produce purely aqueous emulsions of high molecular polyisobutylene capable of being blended with aqueous solutions and dispersions of other solids of a like or unlike nature to produce and improve adhesives, coatings, dressings and the like.

Still another object of the invention is to produce purely aqueous polyisobutylene emulsions having a high degree of stability and to stabilize high molecular aqueous polyisobutylene emulsions by means of small quantities of suitably selected stabilizing agents.

These and other objects which will appear more clearly as the specification proceeds are accomplished, according to the present invention, by the processes and products set forth in the following detailed description, illustratively exemplified in the examples forming part thereof, and defined in the appended claims.

The emulsification of the high molecular weight polyisobutylenes is effected, according to the invention, by means of a "cold milling method" which has been found to be particularly suitable for polyisobutylenes having molecular weights between 27,000 and 200,000 or higher. In this "cold milling method," the polyisobutylene is first kneaded with an aqueous liquid, such as water, and an emulsifying agent in the form of a water soluble alkali metal or ammonium soap of a fatty acid having more than 10 carbon atoms in the molecule until a thorough dispersion of the emulsifying agent and the liquid in the polyisobutylene has been obtained and the mixture has become plastic.

Suitable emulsifying agents for use in this first step of the "cold milling method" are for instance sodium stearate, potassium stearate, sodium palmitate, ammonium oleate, potassium oleate, sodium oleate and similar fat acid soaps. Instead of the neutral soaps, mixtures of such soaps with smaller proportions of the corresponding unreacted fatty acids may be employed, such as for instance a mixture of 3 parts by weight of sodium stearate with 2 parts by weight of stearic acid or a mixture of 5 parts by weight of potassium stearate with 1 part by weight of oleic acid. Particularly good results are obtained if the fatty acid soaps are formed in situ, for which purpose suitable quantities of a selected fatty acid and of a saponifying agent, such as sodium hydroxide, are separately and successively incorporated into the mixture.

The quantity of emulsifying agent to be used for best results varies with the molecular weight of the polyisobutylene and in dependence upon the absence or presence of water dispersible conjunctive agents in the polyisobutylene mass and upon the nature of the aqueous liquid used. Generally, however, it has been found that the incorporation of between about 1% and 4% of emulsifying agent (calculated on the weight of the polyisobutylene) into the mass will permit the latter to absorb for each 100 g. of polyisobutylene between 25 and 35 cc. of aqueous liquid and, thereby, to assume a high degree of plasticity.

The aqueous liquid may be incorporated into the mass in small successive portions with intervals of several minutes between successive additions, and with constant kneading until the mass assumes the desired plasticity, which is usually the case after about 1 to 2½ hours.

When this stage has been reached, a relatively small quantity of a peptizing agent is added to and incorporated into the plastic mass. It has been found that by means of a properly selected peptizing agent a rapid and complete inversion of the mass can be accomplished, whereby the water becomes the continuous phase and the polyisobutylene and other solids in the mass form an evenly distributed discontinuous phase so that a uniform polyisobutylene-in-water dispersion usually of a pasty appearance is obtained. This dispersion is then diluted to any desired degree with additional quantities of water or other suitable aqueous liquids.

The peptizing agents which have been found effective in producing a rapid inversion of plastic polyisobutylene mixtures having a quantity of an aqueous liquid equal to about 25 to 35% by weight of the polyisobutylene evenly and uniformly dispersed therein, are, in the first place, the so-called "mineral oil sulfonates." The term "mineral oil sulfonates" is used in the present specification and claims to identify the alkali metal neutralization products of acid petroleum sludges obtained from the treatment of high boiling petroleum fractions with fuming or concentrated sulfuric acid. Mineral oil sulfonates from acid petroleum sludges of various origins have been found to be highly efficient as peptizing agents in the "cold milling method" according to the present invention.

Typical mineral oil sulfonates, found useful as peptizing agents, had e. g. the following compositions:

|  | Parts by weight |
|---|---|
| Oil | 23.8 |
| Water | 18.5 |
| Caustic soda | 0.27 |
| Sodium sulfate | 6.12 |
| Sodium sulfonates | 60 | and

|  |  |
|---|---|
| Water | 13.0 |
| Sodium sulfate | .21 |
| Sodium chloride | 2.6 |
| Oil | Nil |
| Sodium sulfonates | 75/80 |

Instead of the mineral oil sulfonates, the alkyl metal sulfonates of the alkyl-aryl compounds containing at least 12 carbon atoms in the molecule and at least 3 of said carbon atoms in one aliphatic chain may be used with approximately equally good results. Compounds of this type are for instance: alpha-sodium sulfonate-beta-isopropyl naphthalene, sodium cetyl benzene sulfonate, sodium abietine sulfonate, alpha-potassium sulfonate-beta-isobutyl naphthalene and other compounds of similar composition.

The quantity of such peptizing agent necessary to effect the inversion varies between about 2% and 4% by weight of the polyisobutylene. If a mineral oil sulfonate is used as peptizing agent, ordinarily not more than 3.3% by weight of the polyisobutylene are required to effect a very rapid, complete and reliable inversion of the semi-plastic mass into a liquid dispersion which can be easily diluted to yield emulsions containing about 40% to 60% by weight of solids.

In certain cases, and particularly where the polyisobutylenes to be emulsified have a molecular weight of 47,000 and higher, it has been found practical, though not indispensable, to mix with the polyisobutylene, prior to the addition of the peptizing agent, a quantity of a conjunctive material capable of being dispersed in water and homogeneously blended with solid polyisobutylene. The following substances have been found to be suitable conjunctive materials for the purposes of the present invention: Rubber, ester gum, rosin, asphalt, chlorinated diphenyl, chlorinated naphthalene and the like. It was found that additions of conjunctive materials not exceeding about 16% by weight of the polyisobutylene to be emulsified will be sufficient for an effective facilitation and acceleration of the emulsification process according to the present invention.

Occasionally, the incorporation of small quantities of casein or water soluble caseinates, such as for instance casein-sodium, into the mixture, prior to the addition thereto of the peptizing agent, has given excellent results with respect to the progress of the emulsification and to the properties of the emulsions. Casein and caseinate additions of about 2.2% to 4% by weight of the polyisobutylene have been found to be highly satisfactory.

According to a specific feature of the invention, the water phases or at least parts thereof may be introduced into the mixture as aqueous solutions of high molecular weight wetting agents selected from the group consisting of the alkali metal sulfates and sulfonates of the aliphatic alcohols, esters and amides having at least 10 carbon atoms in their aliphatic chain. Wetting agents of this type are for instance sodium lauryl sulfate, sodium oleyl sulfate, sodium ethyl oleate sulfonate, potassium sulforicinoleate, sodium oleyl monoethyl amide sulfonate, potassium cetyl sulfate, and similar compounds. The wetting agents are preferably used in solutions of about 1½% to about 6% strength and they have the effect of permitting a more rapid addition of water to the polyisobutylene mass and a very rapid dilution of the inverted mixture without any material increase in the proportion of foreign matter present in the finished emulsions. It should be understood, however, that the process according to the invention may be carried out without the use of any wetting agents if desired.

The purely aqueous polyisobutylene emulsions according to the invention are highly homogeneous and uniform, since more than 80% by weight of their total solids content consists of polyisobutylene. The emulsions may be made to have a solids content between about 40% and 60% by weight. Emulsions containing about 50% of solids are quite fluid, but have a sufficient viscosity to prevent too rapid creaming although a very slight separation is noticed after 24 hours standing. This separation appears to be purely mechanical, as the two layers formed can be stirred to reproduce the fluid emulsion without any effect on its original particle size or workability. The separation is more pronounced in emulsions having a water content of more than 55% and it is entirely absent from emulsions having a water content of 45% or less. It may also be mentioned that the emulsions containing between 53% and 55% of solids exhibit a thixotropic phenomenon, i. e. the emulsions have a tendency to thicken on standing, but immediately become fluid when stirred. Polyisobutylene emulsions, made according to the invention, have no tendency to coagulate upon agitation and show good mechanical stability.

It has been found that the stability of all purely aqueous polyisobutylene emulsions can be substantially increased by the addition of certain protective colloids in very small amounts. Outstanding in this respect are the water soluble alkyl esters of cellulose having from 1 to 5 carbon atoms in their alkyl radicals, such as cellulose methyl ether, cellulose ethyl ether, cellulose propyl ether, cellulose butyl and isobutyl ethers and cellulose amyl and isoamyl ethers. Although these ethers in very small quantities are effective as stabilizers for purely aqueous polyisobutylene emulsions of any type, they have given best results in purely aqueous emulsions according to the present invention, due, probably to the high degree of homogeneity and to the relatively great inherent stability of these emulsions. Thus, emulsions made according to the present invention which contained as much as 55% and more of water have been effectively stabilized by the addition of as little as 0.1% (calculated on the weight of all the solids in the emulsion) of a suitably selected cellulose alkyl ether. To prevent the ethers from impairing the films obtained from the emulsions by imparting thereto a harsh feel and a susceptibility to water, it is imperative that the amount of ether added to the emulsion be kept at a minimum and a proportion of 0.25% based on the weight of the solid contents should not be exceeded.

The total time consumed by the preparation of the purely aqueous polyisobutylene emulsions according to the present invention including the time required for the dilution of the inverted masses to the desired concentrations and the time needed for the incorporation of the stabilizing agents where desired, varies between about one hour and 20 minutes and two hours and 45 minutes.

The total solid contents of the polyisobutylene emulsions prepared according to the present invention may be composed of about 80% to 94% by weight of polyisobutylene having a molecular weight above 27,000, about 0.8% to 3.4% by weight of an emulsifying soap or soap mixture of the type described, about 1.7% to 3.2% by weight of a peptizing agent selected from the mineral oil sulfonates and the alkali metal sulfonates of the specified high molecular alkyl-aryl compounds, up to about 13.1% by weight of a hydrophilic conjunctive material capable of being homogeneously blended with polyisobutylene, up to about 3.4% by weight of casein or casein alkali, up to about 2.8% by weight of one or more high molecular wetting agents selected from the alkali metal sulfates and sulfonates of certain long chain aliphatic compounds, and up to 0.25% by weight of a stabilizing agent in the form of a water soluble cellulose alkyl ether. The total quantity of all the emulsifying, wetting, dispersing, peptizing and stabilizing agents may vary between about 5% and 8.6% of the total weight of all the solids in the emulsion.

The emulsions obtained according to the present invention have good aging properties. Samples were found to be in excellent condition several years after they had been prepared. If the viscosity of the emulsion is properly adjusted or the emulsion is stabilized with a suitable agent, no separation or creaming will occur, although such separation or creaming do not seem to have any detrimental effect on the emulsions, as the layers can be readily reunited by stirring. The emulsions are practically free of bacteria and sugars, and therefore there does not seem to be any danger of instability due to fermentation which sometimes occurs in natural latex.

The following examples may serve to illustrate the invention, but are not intended to limit its scope:

Example 1

A purely aqueous polyisobutylene emulsion was prepared from the following ingredients:

Polyisobutylene (mol. weight 47,000) ____g__ 600
Pale crepe rubber (40 min. breakdown)__g__ 65
Stearic acid_____g__ 12
Sodium hydroxide (technical)_____g__ 1
Sodium lauryl sulfate_____g__ 20
Mineral oil sulfonate (purified sodium salt of an acid petroleum sludge obtained from the treatment of a high boiling fraction of Californian mineral oil with fuming sulfuric acid) _____g__ 12
Water _____cc__ 600

The polyisobutylene was allowed to engage the blades of a jacketed mill, such as a Werner & Pfleiderer mixer, and the rubber was added. After about two minutes of mixing, the stearic acid (which also aided plasticization) was introduced and thoroughly dispersed in the mixture for about 15 minutes. 2 cc. of a 36% aqueous solution containing 1 g. of sodium hydroxide and about 1.5 cc. of water were then run in, and the mass was mixed for about 20 minutes. Up to this point, the heat of friction was sufficient to raise the temperature to between 40° and 45° C. and no water was supplied to the jacket. Cold water was now passed through the jacket until the mass was cooled to about 32° C. Simultaneously, an aqueous solution of sodium lauryl sulfate (5% strength) was added in 10 cc. portions in about three minute intervals. The first addition caused the mass to crumble, but this was only temporary and after a few minutes the mixture united again. The next addition caused the mass to whiten because of the dispersion of water therein. After an hour and 3 minutes, 210 cc. of the solution (equal to 35 cc. per 100 g. of polyisobutylene) containing about 203.5 cc. water and 10.6 g. sodium lauryl sulfate had been incorporated into the mixture, and the mass had become extremely plastic and appeared as though it were drying out.

At this point, i. e. after one hour and 40 minutes from the start of the process, the mineral oil sulfonate was added and worked into the mixture. Immediately the mass became pasty and, in about 5 minutes, it had become completely inverted into a thick creamy dispersion containing water as the continuous phase and polyisobutylene as the discontinuous phase. This dispersion was then diluted by stirring into it first in about 5 minutes 300 cc. of a 3% aqueous solution of sodium lauryl sulfate containing the remaining 9.4 g. of the sulfate and about 295 cc. water and, thereafter, in further 5 minutes, the remaining 100 cc. of the water. The total time consumed was 1 hour and 55 minutes.

The resulting smooth, uniform and highly stable, purely aqueous polyisobutylene emulsion had about 54% by weight of solid contents of the following composition:

| Material | Weight | Per cent by weight of polyisobutylene | Per cent by weight of all solids |
|---|---|---|---|
| | Grams | | |
| Polyisobutylene | 600.0 | 100 | 84.56 |
| Crepe rubber | 65.0 | 10.8 | 9.16 |
| Sodium stearate | 7.7 | 1.2 }2.00 | 1.08 }1.76 |
| Stearic acid | 4.8 | 0.8 | 0.68 |
| Sodium lauryl sulfate | 20.0 | 3.4 | 2.82 |
| Mineral oil sulfonate | 12.0 | 2.0 | 1.70 |
| | 709.5 | 118.2 | 100.00 |

The total amount of emulsifying, wetting and peptizing agents in the emulsion was 6.28% calculated on the total weight of the solids in the emulsion.

*Example 2*

600 g. polyisobutylene having an average molecular weight of 60,000 were kneaded on a rubber mill for 5 minutes with 24.5 g. casein and thereafter for 15 minutes with 12 g. stearic acid. 65 g. pale crepe rubber were added and the mixture was kneaded for 5 more minutes. A 5% aqueous solution of sodium hydroxide was then gradually worked into the mass until, after 15 minutes, 32 cc. of the lye containing 31 cc. water and 1.7 g. caustic soda had been incorporated into and thoroughly dispersed in the mixture. Then, 10 cc. portions of a 4% aqueous sodium lauryl sulfate solution were admixed to the mass in 2 minute intervals until, after 24 minutes, 120 cc. of the solution containing about 5 g. of the sulfate and 116 cc. water had become dispersed in the mass which, at this time, 1 hour and 4 minutes after the start of the process, contained about 25 cc. of liquid for each 100 g. of polyisobutylene and had assumed a very high plasticity. Now, there were added 20 g. of a mineral oil sulfonate, which consisted of the purified sodium salt of an acid petroleum sludge obtained from the treatment of a high boiling fraction of Texan mineral oil with fuming sulfuric acid. Within 5 minutes inversion took place and then, the pasty emulsion was diluted by stirring into it in 15 minutes 450 cc. water, so that the total amount of water in the emulsion, including the water resulting from the saponification of the stearic acid, amounted to about 600 cc. or 45% by weight. The total time consumed was 1 hour and 24 minutes.

The solid contents had the following composition:

| Material | Weight | Per cent by weight of polyisobutylene | Per cent by weight of all solids |
|---|---|---|---|
| | Grams | | |
| Polyisobutylene | 600.0 | 100.0 | 82.50 |
| Crepe rubber | 65.0 | 10.8 | 8.92 |
| Casein | 24.5 | 4.2 | 3.37 |
| Sodium stearate | 13.0 | 2.1 | 1.78 |
| Sodium lauryl sulfate | 5.0 | 0.8 | 0.68 |
| Mineral oil sulfonate | 20.0 | 3.3 | 2.75 |
| | 727.5 | 121.2 | 100.00 |

The total quantity of dispersing, emulsifying, wetting and peptizing agents in the emulsion amounted to 8.6% by weight of all the solids.

*Example 3*

500 g. of polyisobutylene having an average molecular weight of 35,000 were kneaded for 30 minutes with a mixture containing 5 g. potassium stearate and 3 g. oleic acid. Then 100 cc. of a soap solution containing 93 cc. water and 10 g. potassium stearate were worked into the mixture in 10 cc. portions following each other in 6 minute intervals, until after one hour, the entire quantity of soap water had become dispersed in the mixture. Thereafter, 10 cc. portions of water were added in 5 minute intervals. After 15 minutes, 1 hour and 45 minutes from the beginning of the process, the mass had absorbed 30 cc. of water and showed a very high degree of plasticity. The total quantity of liquid dispersed in the mass was at this time 130 cc., equal to 26 cc. per each 100 g. of polyisobutylene.

Now, 15 g. of a mineral oil sulfonate consisting of a potassium neutralized acid petroleum sludge obtained from the treatment of a high boiling fraction of Rumanian mineral oil with concentrated sulfuric acid were added to and worked into the mass until inversion occurred after about 15 minutes. Finally the emulsion was diluted to a concentration of about 50% by weight of solids by stirring 410 cc. water into the pasty mass resulting from the inversion. The dilution consumed another 15 minutes, and the completed, smooth and uniform, purely aqueous emulsion of the desired concentration was made within 2 hours and 15 minutes.

The solid contents of the emulsion had the following composition:

| Material | Weight | Per cent by weight of polyisobutylene | Per cent by weight of all solids |
|---|---|---|---|
| | Grams | | |
| Polyisobutylene | 500.0 | 100.0 | 93.8 |
| Potassium stearate | 15.0 | 3.0 }3.6 | 2.8 }3.4 |
| Oleic acid | 3.0 | 0.6 | 0.6 |
| Mineral oil sulfonate | 15.0 | 3.0 | 2.8 |
| | 533.0 | 106.6 | 100.0 |

The total quantity of emulsifying and peptizing agents in the emulsion amounted to 6.2% by weight of all the solids.

*Example 4*

25 g. rosin were thoroughly mixed and interspersed with 15 g. sodium palmitate for about 10 minutes. The resulting mixture was added to and kneaded for 35 minutes into 500 g. polyisobutylene having an average molecular weight of 27,000. 10 cc. portions of a 3% aqueous solution of sodium ethyl oleate sulfonate, $$CH_3.(CH_2)_7.CH:CH.(CH_2)_7.COO.C_2H_4.SO_3Na$$

were worked into the mixture in 3 minute intervals until, after 45 minutes, i. e. 1 hour and 30 minutes after the start of the process, the mass had absorbed 150 cc. of liquid (30 cc. for each 100 g. of polyisobutylene) containing 4.5 g. of the sulfonated ester and 147 cc. of water, and a high degree of plasticity had been attained.

Now, 17.5 g. of alpha-sodium-sulfonate beta-isopropyl naphthalene were added to the mass and kneaded therewith. Inversion was completed after 10 minutes. The resulting paste was diluted by stirring into it, first, within 7 minutes, 350 cc. of a 2% aqueous solution of sodium ethyl oleate sulfonate containing 7 g. of the sulfonated ester and 345 cc. of water and, then, within further 5 minutes, 158 cc. water to produce a smooth, uniform emulsion containing about 47% by weight of solids. The stability of this emulsion was insured by the addition of 0.7 g. water soluble cellulose methyl ether, which was stirred into the finished emulsion for 3 minutes. The total time consumed in the preparation of the stabilized emulsion was 1 hour and 55 minutes.

The solid contents of the emulsion had the following composition:

| Material | Weight | Per cent by weight of polyisobutylene | Per cent by weight of all solids |
|---|---|---|---|
| | Grams | | |
| Polyisobutylene | 500.0 | 100.00 | 87.76 |
| Rosin | 25.0 | 5.00 | 4.40 |
| Sodium palmitate | 15.0 | 3.00 | 2.63 |
| Sodium ethyl oleate sulfonate | 11.5 | 2.30 | 2.02 |
| Alpha-sodium-sulfonate beta-isopropyl-naphthalene | 17.5 | 3.50 | 3.07 |
| Cellulose methyl ether | 0.7 | 0.14 | 0.12 |
| | 569.7 | 113.94 | 100.00 |

The total amount of emulsifying, wetting, peptizing and stabilizing agents in the emulsion was 7.84% calculated on the weight of all the solids in the emulsion.

*Example 5*

500 g. of polyisobutylene having an average molecular weight of 80,000 were for 25 minutes thoroughly kneaded and mixed with 33 cc. of a 15% aqueous solution of ammonium oleate containing 5 g. soap to 30 cc. water. A 6% aqueous solution of potassium sulforicinoleate was added in 10 cc. portions with 5 minute intervals between the successive additions. After 25 minutes, 50 cc. of the solution containing 3 g. sulforicinoleate and 48 cc. water had been incorporated and the mixture formed a coherent fairly easily workable dough, 80 g. ester gum were now introduced and mixed with the polyisobutylene mass for 15 minutes. Then, 80 cc. of an aqueous casein sodium solution containing 11 g. casein sodium and 73 cc. water were added in 10 cc. portions following one another in 4 minute intervals until, after 32 minutes, i. e. 1 hour and 37 minutes after the beginning of the process, the entire casein sodium solution had been dispersed in the mixture and the mass had become very plastic. At this moment, the total quantity of liquid absorbed in the mass amounted to 163 cc. or about 33 cc. for each 100 g. of polyisobutylene.

Now, 12.5 g. sodium cetyl benzene sulfonate ($C_{16}H_{33}.C_6H_4.SO_3Na$) were incorporated into the plastic mass and kneaded therewith until inversion had been completed after 5 minutes. The resulting paste was diluted by stirring into it, within 20 minutes, 750 cc. of water containing dissolved therein 1.5 g. cellulose methyl ether. The resulting stable and uniform emulsion contained about 40% by weight of solids. It was obtained in 2 hours and 2 minutes.

The solid contents of the emulsion had the following composition:

| Material | Weight | Per cent by weight of polyisobutylene | Per cent by weight of all solids |
|---|---|---|---|
| | Grams | | |
| Polyisobutylene | 500.0 | 100.0 | 81.57 |
| Ammonium oleate | 5.0 | 1.0 | 0.82 |
| Potassium sulforicinoleate | 3.0 | 0.6 | 0.48 |
| Ester gum | 80.0 | 16.0 | 13.05 |
| Casein sodium | 11.0 | 2.2 | 1.79 |
| Sodium cetylbenzene sulfonate | 12.5 | 2.5 | 2.04 |
| Cellulose methyl ether | 1.5 | 0.3 | 0.25 |
| | 613.0 | 122.6 | 100.00 |

The total quantity of emulsifying, wetting, dispersing, peptizing and stabilizing agents in the emulsion was 5.38% by weight of all the solids.

*Example 6*

75 g. of an asphalt (melting point 82° C.) were added in successive 25 g. portions to 500 g. polyisobutylene having an average molecular weight of 40,000, each portion being worked with the polyisobutylene for about 3 minutes so that after 10 minutes a homogeneous polyisobutylene-asphalt mixture was obtained. 12.5 g. potassium oleate were kneaded into this mixture for 35 minutes. Thereafter, a 2% aqueous solution of sodium oleyl monethyl amide sulfonate, $$CH_3.(CH_2)_7.CH:CH.(CH_2)_7.CO.NH.C_2H_4.SO_3Na$$

was added in 10 cc. portions following each other in about 4 minute intervals under constant working of the mass. After one hour, 150 cc. of the solution containing 3 g. of the sulfonated amide and 148 cc. of water had been absorbed by the mass. At this time, i. e. 1 hour and 45 minutes after the start of the process, the mixture which contained 30 cc. of liquid for each 100 g. of polyisobutylene had become extremely plastic and appeared to dry out.

Now, 20 g. sodium abietine sulfonate were added and worked into the mixture for 10 minutes. At the end of this period complete inversion had taken place. The resulting paste was diluted first with 500 cc. sodium oleyl sulfate solution (1½% strength) which contained 496 cc. water and 7.5 g. of the sulfate and was stirred into the pasty mass within 12 minutes and, thereafter, within 3 more minutes, with 110 cc. water having 0.6 cellulose methyl ether dissolved therein to stabilize the emulsion. The final, smooth, uniform and stable emulsion, which was prepared in 2 hours and 10 minutes, contained about 45% by weight of solids having the following composition:

| Material | Weight | Per cent by weight of polyisobutylene | Per cent by weight of all solids |
|---|---|---|---|
| | Grams | | |
| Polyisobutylene | 500.0 | 100.00 | 80.83 |
| Asphalt | 75.0 | 15.00 | 12.12 |
| Potassium oleate | 12.5 | 2.50 | 2.02 |
| Sodium oleyl sulfate | 7.5 | 1.50 }2.10 | 1.21 }1.70 |
| Sodium oleyl mono-ethyl amide sulfonate | 3.0 | 0.60 | 0.49 |
| Sodium abietine sulfonate | 20.0 | 4.00 | 3.23 |
| Cellulose methyl ether | 0.6 | 0.12 | 0.10 |
| | 618.6 | 123.72 | 100.00 |

The total quantity of emulsifying, wetting, peptizing and stabilizing agents in the emulsion was 6.95% by weight of all solids.

*Example 7*

50 g. beta-chloro naphthalene were mixed for 10 minutes and thoroughly dispersed with 500 g. polyisobutylene having an average molecular weight of 120,000. 20 g. sodium oleate were kneaded into this mixture for 60 minutes. Then, a 5% aqueous solution of potassium cetyl sulfate was added in 10 cc. portions following one another in intervals of about 5 minutes each. After 1 hour and 15 minutes, i. e. 2 hours and 25 minutes from the start of the operation, the mass had absorbed 150 cc. of the solution containing 146 cc. water and 7.5 g. sulfate. At this time, the mixture contained for each 100 g. of polyisobutylene about 30 cc. liquid and had become highly plastic.

Now, 12.5 g. alpha-potassium-sulfonate beta-butyl naphthalene were worked into the mass which became completely inverted after 10 minutes. The resulting paste was diluted with 250 cc. water within 10 minutes to an emulsion containing about 60% by weight of solids. The total time consumed in the manufacture of the emulsion was 2 hours and 45 minutes.

The solid contents of the emulsion had the following composition:

| Material | Weight | Per cent by weight of polyisobutylene | Per cent by weight of all solids |
|---|---|---|---|
| | Grams | | |
| Polyisobutylene | 500.0 | 100.0 | 84.74 |
| Beta-chloro naphthalene | 50.0 | 10.0 | 8.47 |
| Sodium oleate | 20.0 | 4.0 | 3.40 |
| Potassium cetyl sulfate | 7.5 | 1.5 | 1.27 |
| Alpha-potassium-sulfonate beta-butyl naphthalene | 12.5 | 2.5 | 2.12 |
| | 590.0 | 118.0 | 100.00 |

The total amount of emulsifying, wetting and peptizing agents in the emulsion was about 6.8% calculated on the weight of all the solids.

The purely aqueous, smooth, uniform and stable polyisobutylene emulsions obtained according to the present invention have many uses, some of which will be briefly indicated hereinafter.

One of their principal uses is in the formation of films such as for coatings, dressings and the like. Dry films obtained from emulsions, made according to the invention, have the appearance of Cellophane films being clear, transparent and very flexible. They do not possess the tensile strength of latex films. When the films are freshly deposited they are dry to the touch, but, as they age, there is a tendency to develop a gloss and a tacky surface. This tendency may be reduced or eliminated by adding to the polyisobutylene emulsions certain incompatible substances such as emulsified carnauba wax or hydrogenated fish oil in amounts of from 5 to 10% by weight based on the solids content of both emulsions.

The polyisobutylene emulsions according to the invention may have incorporated therein the pigments and fillers used in compounding rubber latex, i. e. clays, chalk, carbon black, zinc oxide and the like, provided these additions are first dispersed in water with a suitable dispersing agent, such as the aromatic sulfonates, i. e. the naphthalene and alkylated naphthalene sulfonates.

The new purely aqueous polyisobutylene emulsions are especially suited for blending with rubber latex, either natural, synthetic, prevulcanized or concentrated. While no particular precautions need be observed, it is best to add the polymer emulsion to the rubber emulsion to prevent "seeding."

There are on the market several forms of synthetic rubber latex derived from dichlor-butadiene and sold as "neoprene" latex. These synthetic latices deposit films which are stiff and boardy and freeze or become brittle at moderately low temperatures. There is a very pressing need for a plasticizer for these products. Natural rubber latex has been suggested, but it leaves much to be desired. This need is adequately supplied by the polyisobutylene emulsions obtained according to the present invention. Thus, a "neoprene" latex may be blended with a polyisobutylene emulsion and the films cast therefrom, when dried, will be found to be eminently satisfactory from the standpoint of softness and flexibility.

Polyisobutylene emulsions according to the invention are also well adapted for blending with adhesives of the protein and dextrin type. Thus, a casein, glue or gelatine solution may be blended with a polyisobutylene emulsion in any desired ratio. Generally, the polymer gives the adhesive films improved flexibility and toughness, the improvement being roughly in proportion to the amount of polymer present. Most plasticizers for such adhesives are hygroscopic. By resorting to the polymer emulsions this defect is avoided.

Films obtained from polyisobutylene emulsions according to the invention containing casein (see Examples 2 and 5) have a very high resistance to lard oil. Paper coated with such an emulsion showed no signs of penetration by lard oil, even after 5 days continuous contact.

Another field where the present aqueous polyisobutylene emulsions can be advantageously used with casein is in casein paints to improve the flexibility of the paint films.

The polyisobutylene emulsions of the invention are further capable of being blended with resin emulsions and render the films obtained from the latter tougher and more flexible. The resin, on the other hand, gives the polymer a more rubbery stretch, increases the modulus and decreases the set. There is, therefore, a particular effect of each component on the other. The products which combine resins and polyisobutylene are particularly fitted for use as thermoplastic and pressure sensitive adhesives. Adhesive films of such compositions are suitable for use as foil seals or can labels, for laminating, as intermediate layers between paper sheets to lower moisture transmission and for adhering facings to baking materials.

The new polyisobutylene emulsions are also capable of being blended with wax solutions and emulsions. Better adhesion and flexibility are noted, for instance, when a paraffin wax emulsion is blended with a polymer emulsion.

Silicate compounds have been proposed as adhesives, but up to now no plasticizers have been found which can be used satisfactorily with these compounds. Rather unexpectedly, it was discovered that the purely aqueous polyisobutylene emulsions of the present invention meet all the requirements. The silicate solutions may be blended with the polymer emulsions in different ratios. With a sodium silicate having a ratio of 3:12 ($SiO_2$:$Na_2O$) and a solids content, when dry, of 50.5% blends of silicate to emulsion may be made in the rations of 1:1, 3:1, 5:1 and 10:1. A minimum of 12.5% polymer (dry) is required to overcome the brittleness of the silicate. The products of the first two blends are rubbery. The last blend does not yield rubbery films, but the silicate is not brittle and does not chip when scraped. To combine the silicate with the polyisobutylene, it has been found best to add part of the silicate to the polyisobutylene emulsion and then to add this mixture to the balance of the silicate. The use of protective colloids and colloid milling enhances dispersion.

In addition to the uses specified, the polyisobutylene emulsions according to the invention, either alone or in suitable blends, may be employed in the making of leather dressings, cable insulations, gloves for electrical and chemical workers, rubber thread, pigmented paper coatings and many other purposes.

Polyisobutylene is remarkably resistant to acids and other corrosive media. The emulsions of the present invention, therefore, find use in linings for tanks, cars, pipes, barrels, carboys and other containers for such media. It was further found that these emulsions may be used to manufacture wrappings in sheet form for glass carboys or containers for corrosive liquids, so that, should the container be broken, the wrapping will retain the liquid and prevent leakage and damage.

Various modifications of the invention will occur to those skilled in the art, and I, therefore, do not intend to be limited by the patent granted except as required by the following claims.

I claim:

1. A process for making purely aqueous emulsions of polyisobutylene having an average molecular weight above 27,000 which process comprises the steps of kneading the polyisobutylene with an aqueous liquid and an emulsifying agent selected from the group consisting of the water soluble alkali metal and ammonium soaps of the fatty acids having more than 10 carbon atoms in the molecule and the mixtures of such soaps with the corresponding unreacted fatty acids until a thorough dispersion of the emulsifying agent and liquid in the polyisobutylene mass has been obtained and the mixture has become plastic, then causing an instantaneous inversion of the dispersion by adding thereto a peptizing agent selected from the group consisting of the mineral oil sulfonates and the alkali metal sulfonates of the alkyl-aryl compounds containing at least 12 carbon atoms in the molecule, at least three of said carbon atoms being disposed in one aliphatic chain, and diluting the resulting paste with an aqueous liquid.

2. A process, as claimed in claim 1, in which the quantity of emulsifying agent used is between about 1% and about 4% by weight of the polyisobutylene, and the quantity of peptizing agent used is between about 2% and 4% by weight of the polyisobutylene.

3. A process, as claimed in claim 1, in which the quantity of aqueous liquid incorporated into the polyisobutylene mass prior to the addition of the peptizing agent varies between about 25 cc. and 35 cc. per each 100 g. of polyisobutylene in the mass.

4. A process, as claimed in claim 1, including the step of kneading with the polyisobutylene mass, prior to the addition thereto of the peptizing agent, up to 16% by weight of the polyisobutylene of a conjunctive material capable of being dispersed in water and homogeneously blended with solid polyisobutylene, which material accelerates and facilitates the emulsification.

5. A process, as claimed in claim 1, including the step of incorporating into the polyisobutylene mass, prior to the addition thereto of the peptizing agent, up to 4% by weight of the polyisobutylene of a colloid selected from the group consisting of casein and the water soluble caseinates.

6. A process, as claimed in claim 1, in which at least part of the aqueous liquid used consists of an aqueous solution of a high molecular weight wetting agent selected from the group consisting of the alkali metal sulfates and sulfonates of the aliphatic alcohols, esters and amides having at least 10 carbon atoms in the aliphatic chain.

7. A process, as claimed in claim 1, including the step of stabilizing the aqueous emulsion by the addition thereto of a water soluble cellulose alkyl ether having from 1 to 5 carbon atoms in an alkyl radical, said ether being added in an amount equal to between about 0.1% and 0.25% by weight of all the solids in the emulsion.

8. A process for making purely aqueous emulsions of polyisobutylene having an average molecular weight above 27,000 which process comprises the steps of kneading the polyisobutylene with from about 1 to 4% of its weight of an emulsifying agent selected from the group consisting of the water soluble alkali metal and ammonium soaps of the fatty acids having more than 10 carbon atoms in the molecule and the mixtures of such soaps with smaller proportions of the corresponding unreacted fatty acids while gradually adding for each 100 g. of polyisobutylene between about 25 cc. and 35 cc. of an aqueous liquid until a thorough dispersion of the emulsifying agent and liquid in the polyisobutylene mass has been obtained and the mixture has become plastic, then inverting the dispersion by adding thereto as a peptizing agent a mineral oil sulfonate in an amount equal to from about 2% to about 3.3% by weight of the polyisobutylene, and, after inversion, diluting the resulting paste with an additional quantity of an aqueous liquid.

9. A process for making a purely aqueous polyisobutylene emulsion comprising the steps of kneading with about 600 g. polyisobutylene having a molecular weight in the neighborhood of 47,000, in succession, 65 g. pale crepe rubber, 12 g. stearic acid, and 2 cc. of a 36% aqueous sodium hydroxide solution, gradually adding 210 cc. of a 5% aqueous sodium lauryl sulfate solution, working until the mass becomes plastic, then incorporating into the mass 12 g. of a mineral oil sulfonate and, after inversion, diluting with 300 cc. 3% aqueous sodium lauryl sulfate solution and 100 cc. water.

10. A process for making a purely aqueous polyisobutylene emulsion comprising the steps of kneading with about 500 g. polyisobutylene having an average molecular weight in the neighborhood of 35,000 a mixture of 5 g. potassium stearate with 3 g. oleic acid, adding gradually 100 cc. aqueous potassium stearate solution containing 10 g. of the soap, working until the mass becomes plastic, then incorporating into the mass 15 g. of a mineral oil sulfonate and, after inversion, diluting with 410 cc. water.

11. A process for making a purely aqueous polyisobutylene emulsion comprising the steps of kneading with about 500 g. polyisobutylene having an average molecular weight in the neighborhood of 80,000 33 cc. of a 15% aqueous solution of ammonium oleate, gradually working into this mixture 50 cc. of a 6% aqueous solution of potassium sulforicinoleate, mixing the dough formed with 80 g. ester gum, adding gradually 80 cc. of a sodium caseinate solution containing 11 g. sodium caseinate, working until the mass becomes plastic, then introducing 12.5 g. sodium cetyl benzene sulfonate and kneading it with the plastic mass until inversion has become complete, and diluting with 750 cc. water having 1.5 g. cellulose methyl ether dissolved therein.

GERRY P. MACK.